Nov. 29, 1932.  W. R. WILLETT ET AL  1,889,580
GUIDE MECHANISM FOR COTTON PICKERS
Filed Oct. 10, 1930   3 Sheets-Sheet 1
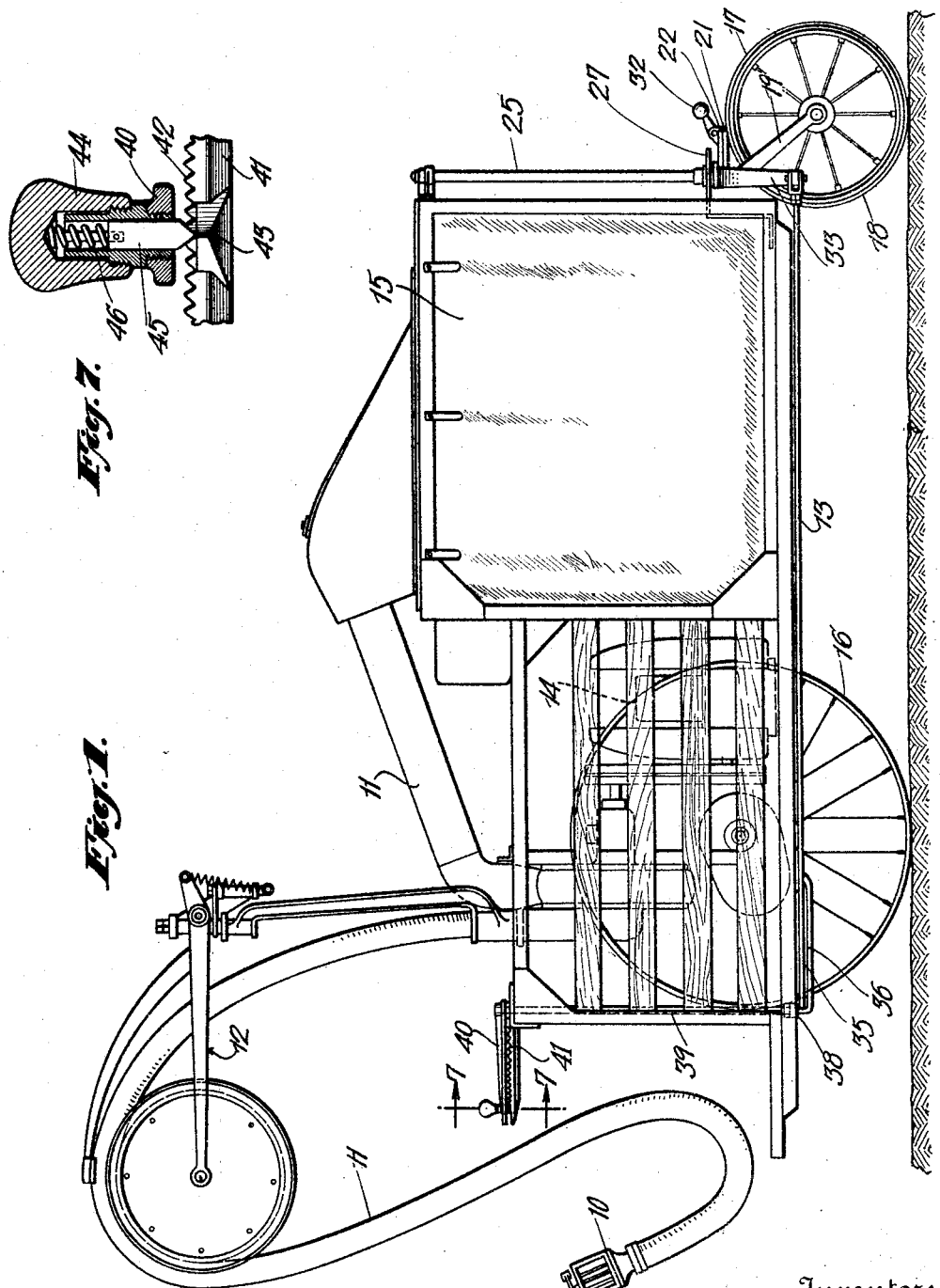
Inventors
WALLACE R. WILLETT.
HARVEY E. BROWN.
By Their Attorneys

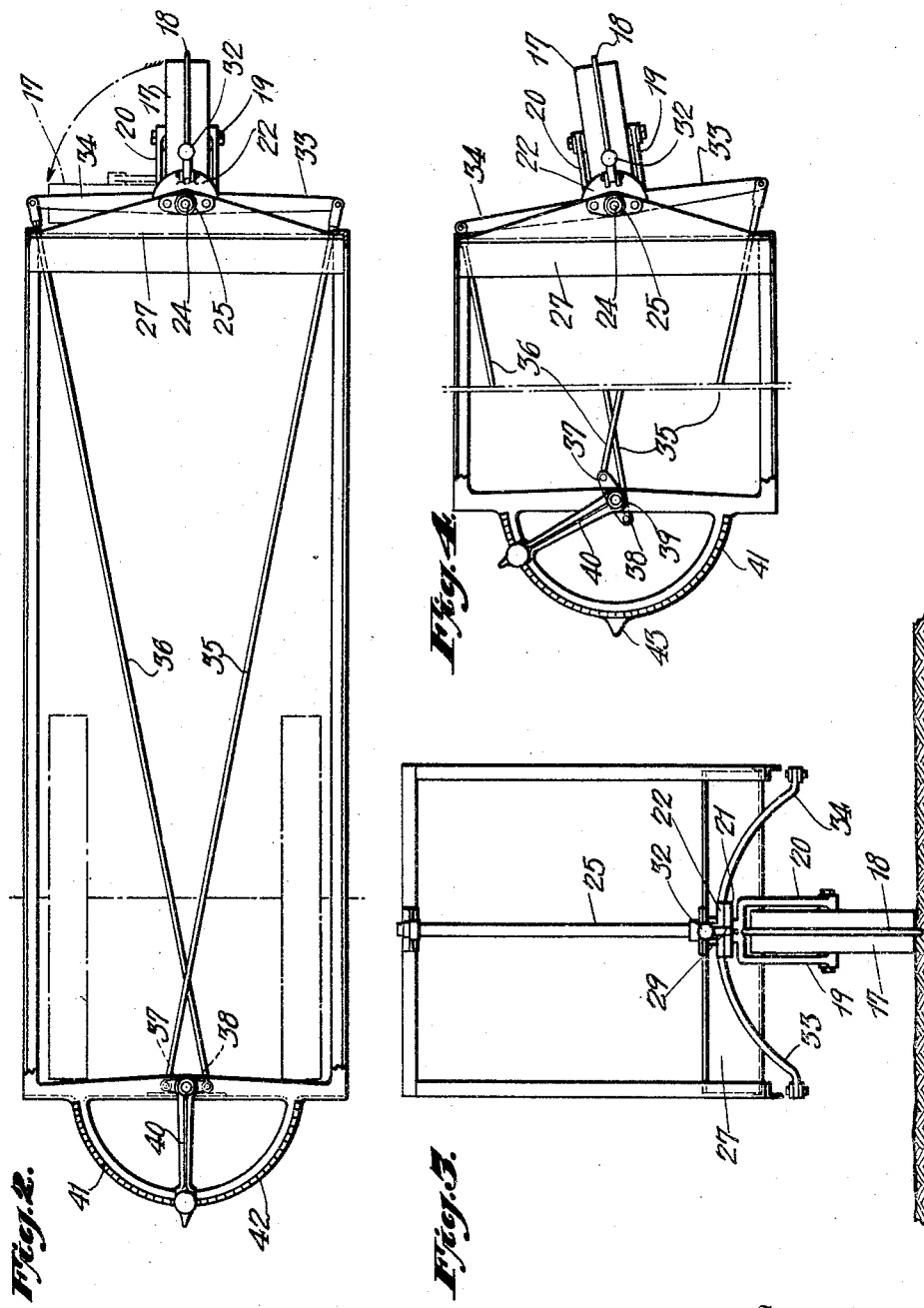

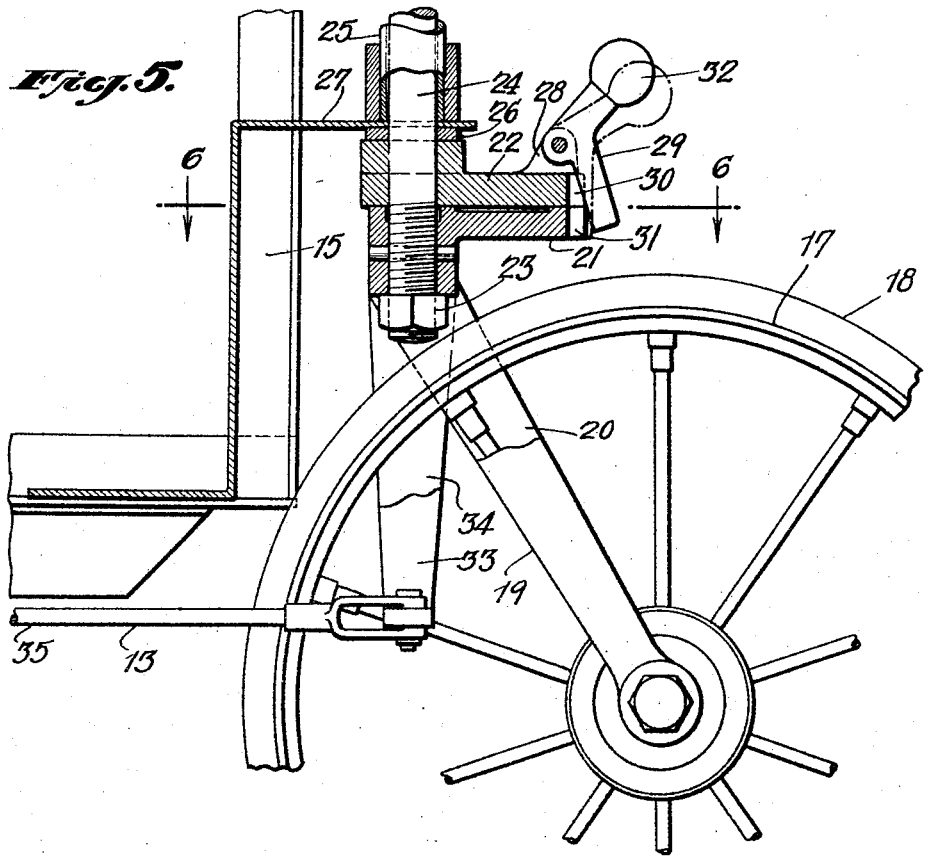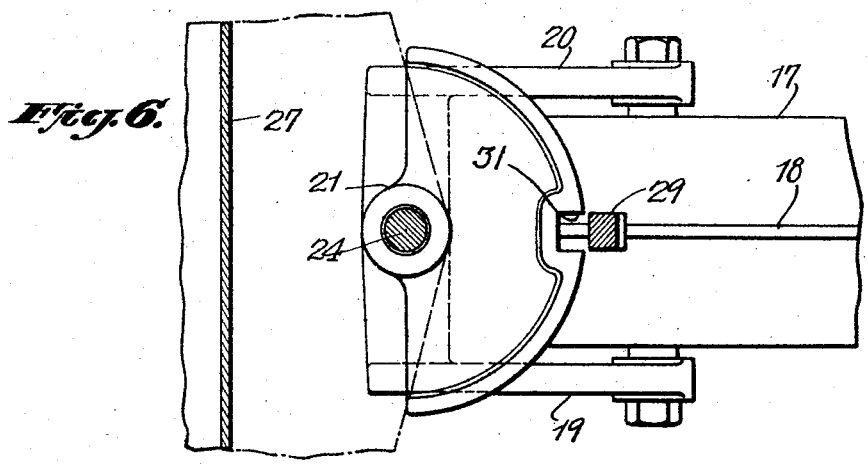

Patented Nov. 29, 1932

1,889,580

UNITED STATES PATENT OFFICE

WALLACE R. WILLETT, OF NEW YORK, N. Y., AND HARVEY E. BROWN, OF ST. LOUIS, MISSOURI, ASSIGNORS TO AMERICAN COTTON PICKER CORPORATION, OF ST. LOUIS, MISSOURI, A CORPORATION OF DELAWARE

GUIDE MECHANISM FOR COTTON PICKERS

Application filed October 10, 1930. Serial No. 487,660.

This invention relates to a cotton picker of the type in which locks of cotton fibers are detached from the boll by picker elements carried by, and brought into contact with selected cotton blossoms by, an operator and are then conveyed from the picker elements to a receptacle mounted on a vehicle that accompanies the operator of the picker elements.

In apparatus of the above indicated type the attention of the operator is directed primarily to bringing the picker elements manually into contact with the fibers of selected blossoms that are in condition to be picked. The detaching of the locks of cotton fiber and their transfer to a suitable receptacle are accomplished automatically and normally without the attention of the operator. As it is desirable for the greatest speed and efficiency in the picking of the cotton that the operator should be able to direct his entire attention to bringing the picker elements into contact with selected blossoms, it is desirable that the vehicle for carrying the cotton receptacle should be self-propelling and self-guiding or self-governing so as to accompany the operator with a minimum of attention on his part.

In our co-pending application Serial No. 487,659 of even date we have disclosed a mechanism whereby the vehicle for carrying the cotton receiving receptacle or bag of apparatus of the above type is made to travel at variable travel of the operator along a row of cotton bushes. It is also desirable that the direction of the vehicle between the rows of cotton bushes should be so controlled that the vehicle remains in its proper position between the rows and holds its position with a minimum of attention on the part of the operator. When the picking of a row of cotton bushes has been completed, it is necessary that the vehicle be relieved from such a guiding or governing apparatus so that it may be turned about or its direction abruptly changed by the operator.

An object of our invention is to accomplish the above mentioned ends.

Further objects of the invention are to provide mechanism for guiding a cotton picker that is simple and easy to construct and operate; to provide a guiding mechanism that may be at will manually suspended and that automatically resumes its action when such manual control is released.

Other objects will appear from the following description.

The various features of the invention are illustrated in the accompanying drawings in which—

Fig. 1 is a side elevation of a cotton picker of the type indicated above and containing a preferred form of embodiment of the invention.

Fig. 2 is a plan view of the guiding mechanism of our invention.

Fig. 3 is a rear vertical view of the cotton picker.

Fig. 4 is a fore-shortened plan view of the guiding mechanism showing the elements in a different position from that shown in Fig. 2.

Fig. 5 is a vertical detail sectional view of a part of the guiding elements showing the manual release device.

Fig. 6 is a horizontal sectional view taken on line 6—6 of Fig. 5, and

Fig. 7 is a sectional view of a guiding element taken on line 7—7 of Fig. 1.

In the accompanying drawings the invention is shown as applied to a cotton picker such as that shown in our co-pending applications Serial Nos. 487,657 and 487,658 of even date and in which picker elements or picker heads 10 are provided on the free ends of suction conveyer tubes 11 suspended on a supporting framework 12 at the front end of a vehicle 13 which contains a suitable motor 14 and carries a cotton bag or receptacle 15. Preferably the apparatus carries two sets of picker heads 10, conveyers 11 and supporting elements 12 and is operated by two operators, one for each picker head.

The vehicle 13 is driven forwardly by the motor 14 and its movement is so controlled as to keep pace with one of the operators, the other operator being thus left free to guide the vehicle 13 between two rows of cotton bushes in addition to the manipulation of his picker head.

The motive power of the motor 14 for moving the vehicle 13 forwardly is applied to a pair of front wheels 16 which drive the vehicle forwardly. The guiding of the vehicle is controlled by means of a rear wheel 17 having a peripherally extending flange 18 and journalled in a fork 19 that extends downwardly and rearwardly from a plate 21. The plate 21 is mounted beneath and in position to support an upper plate 22, and is pivoted thereto by means of a nut 23 on a bolt 24, the stem of which extends through a suitable sleeve 25 to the upper part of the vehicle 15. The plate 21 is thus free to rotate about the axis of the bolt 24 relative to the supporting plate 22. The plate 22 is also free to rotate on the bolt 25 and thus co-axially with the plate 21. The plate 22 serves in turn to support the rear end of the vehicle 15 through a collar 26 and a plate 27 projecting rearwardly from the vehicle.

Mounted on a bracket 28 on the upper rear part of the plate 22 is a pivoted latch or locking bar 29 that is adapted to drop into grooves 30 and 31 in the plates 22 and 21 respectively, when these grooves are aligned. A weight 32 on the locking bar 29 serves to move the locking bar 29 in a direction to drop into the notches 30 and 31. When the locking bar 29 is in both of the grooves 30 and 31, the plate 21 is locked to and rotated by the plate 22 as the latter swings about the axis of the bolt 24.

The plate 22 is rotated about the bolt 24 and is held in set positions or angles on said bolt by means of a pair of outwardly and downwardly extending arms 33 and 34 which are rigidly secured to the plate 22 and which are also secured at their lower free ends by means of links 35 and 36 to the arms 37 and 38 of a guide lever mounted at the forward end of the vehicle. The relative positions of the arms 37 and 38 are reverse to those of their respective arms 33 and 34 and the connecting rods or links 35 and 36, therefore, cross as indicated in Figs. 2 and 4.

The lever arms 37 and 38 are rigidly or integrally connected and are simultaneously moved in one direction or the other by means of a vertical rock shaft 39 that extends to the upper forward part of the vehicle and has secured to its upper end a guiding pointer 40. The guiding pointer 40 projects forwardly and its front end is adapted to swing over a semi-circular arc 41 having on its upper surface a series of notches 42 spaced symmetrically on opposite sides of a central notch immediately above a pointer head 43 that is in alignment with the center line of the vehicle. The pointer arm 40 is provided at its forward end with a knob 44 for movement by the operator and is also provided with a plunger 45 that is pressed by means of a spring 46 downwardly against the segment 41 causing the pointed end of the plunger 45 to engage in one of the several notches 42.

The connecting rods 35 and 36 are of equal length and the relative positions of the pointer 40, arms 37 and 38 and 33 and 34, are such that when the pointer 40 is aligned with the center line of the vehicle, the guide wheel 17 is also in alignment and the vehicle will be directed in a straight line. If this direction of movement should not be parallel with the row of cotton to be picked or if the row should itself deflect or curve, the operator simply swings the pointer 40 in a clockwise direction if the vehicle is to be directed to the right, which thereby swings the guide wheel 17 to the right of the center line. When the vehicle has again taken its proper direction, the pointer is swung to its center line position. Conversely, if the vehicle is to be deflected to the left, the pointer 40 is swung counter-clockwise.

As will be apparent from Figs. 2 and 4, the lever arms 37 and 38 are shorter than the arms 33 and 34 so that a relatively wide swing of the pointer arm 40 is reduced and produces a relatively slighter deflection of the guide wheel 17. In this way a very exact and accurate guidance of the guide wheel 17 is obtained, each adjacent notch of the segment 41 corresponding to a much slighter deflection of the guide wheel 30. When the end of a row has been reached, it is necessary to turn the vehicle very sharply about. It would be difficult, if not impossible, to accomplish this quickly by a movement of the pointer 40.

When the vehicle is to be rapidly turned, the locking bar weight 32 is lifted, thus swinging the locking bar 29 free of the notches 30 and 31 as indicated in Fig. 6 of the drawings. Thereupon the plate 21 may be swung freely relatively to the plate 22 about the bolt 24. It may be swung to a position at right angles to the center line of the vehicle and the vehicle turned by merely pushing sidewise on the rear portion of the machine. When the vehicle has been turned about, the driving of the front wheels 16 causes the wheel 17 to trail, its axis being to the rear of the vertical bolt 24 so that the plate 21 swings relatively to the plate 22. When the notches 30 and 31 are thus brought into alignment, the locking bar 29 automatically locks into position and the movement of the lower plate 21 is again brought under the control of the guiding plate 22.

It will be apparent from the above description that the vehicle is guided with a minimum of attention on the part of the operator, but that the movement of the vehicle or its direction of movement may be at any time altered by the operator and, when such manual movement ceases, the guidance of the vehicle will be automatically resumed by the guiding mechanism.

What we claim is:

1. A cotton picker comprising a vehicle having driving wheels, a guide wheel, means to pivotally mount said guide wheel on an upright axis, a plate pivoted to said guide wheel about said vertical axis and in fixed relation thereto, a guide plate in superposed relation to said wheel plate, said wheel and guide plates having notches positioned to be brought into alignment, a locking bar positioned to drop into said notches when in alignment, a pivoted direction pointer, and means connecting said direction pointer to said guide plate to swing the latter on its pivotal axis proportional to the swing of said pointer.

2. A cotton picker comprising a vehicle having driving wheels, a guide wheel, means to pivotally mount said guide wheel on an upright axis, the axis of said wheel being positioned back of the upright pivotal axis, a plate pivoted to said guide wheel about said vertical axis and in fixed relation thereto, a guide plate in superposed relation to said wheel plate, said wheel and guide plates having notches positioned to be brought into alignment, a weighted latch position to drop into said notches when in alignment, a pivoted direction pointer, and means connecting said direction pointer to said guide plate to swing the latter on its pivotal axis proportional to the swing of said pointer.

3. A cotton picker which comprises a pair of forward driving wheels, a rearwardly positioned guide wheel, a plate pivoted about a vertical axis and carrying said guide wheel in rigid relation therewith, a guide plate in superposed relation to said wheel plate, said wheel and said guide plates having notches adapted to align with the axis of said rear wheel and being rearward of its vertical pivotal axis, a weighted latch bar pivoted to drop into said notches when in alignment, arms extending sidewise of said guide plate, a pivoted pointer at the front of said vehicle, lever arms connected to swing with said pointer, cross links connecting said pointer and lever arms to said guide plate lever arms, a segment for said pointer having a notch in alignment with the center line of said vehicle, and notches spaced symmetrically therefrom.

In witness whereby, we have hereunto signed our names.

WALLACE R. WILLETT.
HARVEY E. BROWN.